United States Patent
Koyama (10) Patent No.: US 10,948,681 B2
(45) Date of Patent: Mar. 16, 2021

(54) SYSTEM FOR BALANCING CENTER OF GRAVITY OF A ZOOM LENS

(71) Applicant: SZ DJI TECHNOLOGY CO., LTD., Shenzhen (CN)

(72) Inventor: Takashi Koyama, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 326 days.

(21) Appl. No.: 16/113,353

(22) Filed: Aug. 27, 2018

(65) Prior Publication Data

US 2019/0011659 A1    Jan. 10, 2019

Related U.S. Application Data (63) Continuation of application No. PCT/CN2016/083581, filed on May 27, 2016.

(51) Int. Cl.
*G02B 7/02* (2006.01)
*G02B 7/00* (2021.01)
*G02B 15/16* (2006.01)
*G02B 27/64* (2006.01)

(52) U.S. Cl.
CPC ............ *G02B 7/001* (2013.01); *G02B 7/021* (2013.01); *G02B 15/16* (2013.01); *G02B 27/64* (2013.01)

(58) Field of Classification Search
CPC ........ G02B 7/001; G02B 7/021; G02B 15/16; G02B 27/64
See application file for complete search history.

(56) References Cited

U.S. PATENT DOCUMENTS

| | | | | |
|---|---|---|---|---|
| 4,731,669 | A | * | 3/1988 | Hayashi ............ H04N 5/23261 348/208.7 |
| 2005/0286141 | A1 | | 12/2005 | Ichinose et al. |
| 2014/0376104 | A1 | | 12/2014 | Fujinaka |
| 2015/0097950 | A1 | | 4/2015 | Wang et al. |
| 2016/0014309 | A1 | | 1/2016 | Ellison et al. |

FOREIGN PATENT DOCUMENTS

| | | |
|---|---|---|
| CN | 1763663 A | 4/2006 |
| CN | 1860396 A | 11/2006 |
| CN | 101004473 A | 7/2007 |
| CN | 101644817 A | 2/2010 |
| CN | 201722051 U | 1/2011 |
| CN | 102016708 A | 4/2011 |
| CN | 201858005 U | 6/2011 |
| CN | 102213814 A | 10/2011 |
| CN | 102243360 A | 11/2011 |
| CN | 202301803 U | 7/2012 |
| CN | 102740006 A | 10/2012 |
| CN | 103250098 A | 8/2013 |

(Continued)

OTHER PUBLICATIONS

The World Intellectual Property Organization (WIPO) International Search Report and Written Opinion for PCT/CN2016/083581 dated Feb. 28, 2017 10 pages.

*Primary Examiner* — Joseph P Martinez
(74) *Attorney, Agent, or Firm* — Anova Law Group, PLLC (57) ABSTRACT

A lens barrel includes one or more movable lens groups, and a cam barrel associated with the one or more movable lens groups and configured to balance a center of gravity of the one or more movable lens groups.

20 Claims, 7 Drawing Sheets

(56) References Cited

FOREIGN PATENT DOCUMENTS

| | | | |
|---|---|---|---|
| CN | 104238105 | A | 12/2014 |
| CN | 204004178 | U | 12/2014 |
| CN | 205209345 | U | 5/2016 |
| EP | 0579137 | A2 | 1/1994 |
| EP | 2423724 | A1 | 2/2012 |
| JP | S58154822 | A | 9/1983 |
| JP | H0628407 | B2 | 4/1994 |
| JP | H08022068 | A | 1/1996 |
| JP | H08110455 | A | 4/1996 |
| JP | H10123400 | A | 5/1998 |
| JP | 2001166194 | A | 6/2001 |
| JP | 201248178 | A | 3/2012 |
| JP | 2015192240 | A | 11/2015 |
| JP | 2016105834 | A | 6/2016 |

\* cited by examiner

SYSTEM FOR BALANCING CENTER OF GRAVITY OF A ZOOM LENS

CROSS-REFERENCE TO RELATED APPLICATION

This application is a continuation of International Application No. PCT/CN2016/083581, filed on May 27, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to imaging devices and more particularly, but not exclusively, to lens systems and imaging systems incorporating same.

BACKGROUND

Aerial imaging has gained popularity in recent years. In a typical aerial imaging system, an imaging device is coupled with an aerial vehicle via a gimbal. The imaging device also can include a zoom lens (or a lens barrel) for capturing images of scenes in various distances.

The zoom lens normally consists of a plurality of lens groups. The lens groups move when the zoom lens zooms in or zooms out, resulting relative position changes among the lens groups. The relative position changes of the plurality of lens groups can cause a shift of a center of gravity of the plurality of lens groups, thereby, causing a shift of a center of gravity of the lens barrel. The shift of the center of gravity of the lens barrel can be an issue for a supporting mechanism, for example the gimbal. The shift of the center of gravity of the lens barrel can cause uncontrolled movements of the gimbal, e.g., a pitch of the gimbal. Therefore, balancing the center of gravity can be needed when the imaging device is coupled with the gimbal.

Currently-available approaches for balancing the center of gravity of the lens groups require at least one additional balance weight, which needs at least one dedicated motor for operating the balance weight in response to the movements of the lens groups. The currently-available approaches have disadvantages, e.g., the balance weight can be an additional burden for the gimbal. In addition, the dedicated motor can add complexity and power consumption of the system.

In view of the foregoing reasons, there is a need for a system for balancing the center of gravity of the lens groups with an existing component of the lens barrel.

SUMMARY

In accordance with a first aspect disclosed herein, there is set forth a lens barrel, comprising:
one or more movable lens groups; and
a cam barrel being associated with the one or more movable lens groups and being configured to balance a center of gravity of the one or more movable lens groups.

In an exemplary embodiment of the disclosed barrel, the cam barrel moves in response to a movement of the one or more movable lens groups.

In another exemplary embodiment of the disclosed barrels, the cam barrel moves to negate a shift of the center of gravity being created by the movement of the one or more movable lens groups.

In another exemplary embodiment of the disclosed barrels, the cam barrel moves to create a first torque change along an optical axis of the lens barrel that negates a second torque change along the optical axis being created by the movements of the one or more movable lens groups.

In another exemplary embodiment of the disclosed barrels, the first torque change negates a sum of the torque changes of the one or more movable lens groups.

In another exemplary embodiment of the disclosed barrels, the cam barrel moves in a first direction along the optical axis that is opposite to a second direction of the shift of the center of gravity of the one or more movable lens groups.

In another exemplary embodiment of the disclosed barrels, the cam barrel balances the center of gravity when the one or more movable lens groups move relative to each other.

Exemplary embodiments of the disclosed lens barrel further comprise a stationary barrel being associated with an inner surface of the cam barrel.

In another exemplary embodiment of the disclosed barrels, the stationary barrel comprises at least one groove or at least one protruding part to cooperate with the cam barrel.

In another exemplary embodiment of the disclosed barrels, the stationary barrel cooperates with the cam barrel for guiding the cam barrel to move along the optical axis.

In another exemplary embodiment of the disclosed barrels, the cam barrel comprises at least one protruding part or at least one groove.

In another exemplary embodiment of the disclosed barrels, the at least one protruding part or the at least one groove of the cam barrel cooperates with the at least one groove or the least one protruding part of the stationary barrel.

In another exemplary embodiment of the disclosed barrels, the cam barrel maintains the shift of the center of gravity of the one or more movable lens groups within a predetermined range.

In another exemplary embodiment of the disclosed barrels, the predetermined range is a range of predetermined percentages of a length of the lens barrel.

In another exemplary embodiment of the disclosed barrels, the predetermined percentages are less than or equal to thirty percent.

In another exemplary embodiment of the disclosed barrels, the cam barrel is formed from a plastic material or a metallic material.

In another exemplary embodiment of the disclosed barrels, the cam barrel is operated mechanically or electronically.

Exemplary embodiments of the disclosed lens barrel further comprise a motor being associated with the cam barrel for operating the cam barrel.

Exemplary embodiments of the disclosed lens barrel further comprise an external weight being associated with the lens barrel.

In another exemplary embodiment of the disclosed barrels, the external weight cooperates with the cam barrel to balance the center of gravity of the one or more movable lens groups.

In another exemplary embodiment of the disclosed barrels, the movements of the one or more lens movable groups are designed for zooming of the lens barrel.

In another exemplary embodiment of the disclosed barrels, the one or more movable lens groups comprise at least one of a first lens group, a second lens group and a third lens group.

In another exemplary embodiment of the disclosed barrels, the shift of the center of gravity of the one or more lens groups is balanced at selected positions along the optical axis.

In accordance with another aspect disclosed herein, there is set forth an imaging device, comprising:
a body; and
a lens barrel coupled with the body and including:
one or more movable lens groups; and
a cam barrel being associated with the one or more movable lens groups and being configured to balance a center of gravity of the one or more movable lens groups.

In an exemplary embodiment of the disclosed imaging device, the cam barrel moves in response to a movement of the one or more movable lens groups.

In another exemplary embodiment of the disclosed imaging devices, the cam barrel moves to negate a shift of the center of gravity being created by the movement of the one or more movable lens groups.

In another exemplary embodiment of the disclosed imaging devices, the cam barrel moves to create a first torque change along an optical axis of the lens barrel, which first torque change negates a second torque change along the optical axis being created by the movements of the one or more movable lens groups.

In another exemplary embodiment of the disclosed imaging devices, the first torque change negates a sum of the torque changes of the one or more movable lens groups.

In another exemplary embodiment of the disclosed imaging devices, the cam barrel moves in a first direction along the optical axis that is opposite to a second direction of the shift of the center of gravity of the one or more movable lens groups.

In another exemplary embodiment of the disclosed imaging devices, the cam barrel balances the center of gravity when the one or more movable lens groups move relative to each other.

Exemplary embodiments of the disclosed imaging devices further comprise a stationary barrel being associated with an inner surface of the cam barrel.

In another exemplary embodiment of the disclosed imaging devices, the stationary barrel comprises at least one groove or at least one protruding part to cooperate with the cam barrel.

In another exemplary embodiment of the disclosed imaging devices, the stationary barrel cooperates with the cam barrel for guiding the cam barrel to move along the optical axis.

In another exemplary embodiment of the disclosed imaging devices, the cam barrel comprises at least one protruding part or at least one groove.

In another exemplary embodiment of the disclosed imaging devices, the at least one protruding part or the at least one groove of the cam barrel cooperates with the at least one groove or the least one protruding part of the stationary barrel.

In another exemplary embodiment of the disclosed imaging devices, the cam barrel maintains the shift of the center of gravity of the one or more movable lens groups within a predetermined range.

In another exemplary embodiment of the disclosed imaging devices, the predetermined range is a range of predetermined percentages of a length of the lens barrel.

In another exemplary embodiment of the disclosed imaging devices, the predetermined percentages are less than or equal to thirty percent.

In another exemplary embodiment of the disclosed imaging devices, the cam barrel is formed from a plastic material or a metallic material.

In another exemplary embodiment of the disclosed imaging devices, the cam barrel is operated mechanically or electrically.

Exemplary embodiments of the disclosed imaging devices further comprise a motor being associated with the cam barrel for operating the cam barrel.

Exemplary embodiments of the disclosed imaging devices further comprise an external weight being associated with the lens barrel.

In another exemplary embodiment of the disclosed imaging devices, the external weight cooperates with the cam barrel to balance the center of gravity of the one or more movable lens groups.

In another exemplary embodiment of the disclosed imaging devices, the movements of the one or more lens movable groups are designed for zooming of the lens barrel.

In another exemplary embodiment of the disclosed imaging devices, the one or more movable lens groups comprise at least one of a first lens group, a second lens group and a third lens group.

In another exemplary embodiment of the disclosed imaging devices, the shift of the center of gravity of the one or more lens groups is balanced at selected positions along the optical axis.

In accordance with another aspect disclosed herein, there is set forth an unmanned aerial vehicle ("UAV"), comprising:
a first body; and
an imaging device coupled to the first body and including:
a second body; and
a lens barrel coupled with the second body and including:
one or more movable lens groups; and
a cam barrel being associated with the one or more movable lens groups and being configured to balance a center of gravity of the one or more movable lens groups.

In an exemplary embodiment of the disclosed UAV, the cam barrel moves in response to a movement of the one or more movable lens groups.

In another exemplary embodiment of the disclosed UAVs, the cam barrel moves to negate a shift of the center of gravity being created by the movement of the one or more movable lens groups.

In another exemplary embodiment of the disclosed UAVs, the cam barrel moves to create a first torque change along an optical axis along an optical axis, which first torque change negates a second torque change along the optical axis being created by the movements of the one or more movable lens groups.

In another exemplary embodiment of the disclosed UAVs, the first torque change negates a sum of the torque changes of the one or more movable lens groups.

In another exemplary embodiment of the disclosed UAVs, the cam barrel moves in a first direction along the optical axis that is opposite to a second direction of the shift of the center of gravity of the one or more movable lens groups.

In another exemplary embodiment of the disclosed UAVs, the cam barrel balances the center of gravity when the one or more movable lens groups move relative to each other.

Exemplary embodiments of the disclosed UAVs further comprise a stationary barrel being associated with an inner surface of the cam barrel.

In another exemplary embodiment of the disclosed UAVs, the stationary barrel comprises at least one groove or at least one protruding part to cooperate with the cam barrel.

In another exemplary embodiment of the disclosed UAVs, the stationary barrel cooperates with the cam barrel for guiding the cam barrel to move along the optical axis.

In another exemplary embodiment of the disclosed UAVs, the cam barrel comprises at least one protruding part or at least one groove.

In another exemplary embodiment of the disclosed UAVs, the at least one protruding part or the at least one groove of the cam barrel cooperates with the at least one groove or the least one protruding part of the stationary barrel.

In another exemplary embodiment of the disclosed UAVs, the cam barrel maintains the shift of the center of gravity of the one or more movable lens groups within a predetermined range.

In another exemplary embodiment of the disclosed UAVs, the predetermined range is a range of predetermined percentages of a length of the lens barrel.

In another exemplary embodiment of the disclosed UAVs, the predetermined percentages are less than or equal to thirty percent.

In another exemplary embodiment of the disclosed UAVs, the cam barrel is formed from a plastic material or a metallic material.

In another exemplary embodiment of the disclosed UAVs, the cam barrel is operated mechanically or electrically.

Exemplary embodiments of the disclosed UAVs further comprise a motor being associated with the cam barrel for operating the cam barrel.

Exemplary embodiments of the disclosed UAVs further comprise an external weight being associated with the lens barrel.

In another exemplary embodiment of the disclosed UAVs, the external weight cooperates with the cam barrel to balance the center of gravity of the one or more movable lens groups.

In another exemplary embodiment of the disclosed UAVs, the movements of the one or more lens movable groups are designed for zooming of the lens barrel.

In another exemplary embodiment of the disclosed UAVs, the one or more movable lens groups comprise at least one of a first lens group, a second lens group and a third lens group.

In another exemplary embodiment of the disclosed UAVs, the shift of the center of gravity of the one or more lens groups is balanced at selected positions along the optical axis.

In accordance with another aspect disclosed herein, there is set forth a method for controlling a cam barrel of a lens barrel, comprising:

moving the cam barrel that is associated with one or more movable lens groups; and balancing a center of gravity of the one or more lens group via the moving.

In an exemplary embodiment of the disclosed method, moving the cam barrel comprising controlling a movement of the cam barrel via one or more controllers.

In another exemplary embodiment of the disclosed methods, controlling the movement comprises operating a driving mechanism being associate with the cam barrel.

In another exemplary embodiment of the disclosed methods, moving the cam barrel comprising driving the one or more lens groups via the moving the cam barrel.

In another exemplary embodiment of the disclosed methods, driving the one or more lens groups comprises moving the one or more lens groups in a predesigned manner.

In another exemplary embodiment of the disclosed methods, moving the one or more lens groups in the predesigned manner comprises changing a position of the one or more lens groups in accordance with a zooming requirement of the lens barrel.

In another exemplary embodiment of the disclosed methods, balancing the center of gravity comprises negating the shift of the center of gravity of the one or more movable lens groups.

In another exemplary embodiment of the disclosed methods, negating the shift of the center of gravity comprises offsetting the shift of the center of gravity being created by the movement of the one or more movable lens groups.

In another exemplary embodiment of the disclosed methods, offsetting the shift of the center of gravity comprises offsetting a sum of torque changes, along an optical axis of the lens barrel, of the one or more movable lens groups.

In another exemplary embodiment of the disclosed methods, offsetting the sum of torque changes comprises moving the cam barrel in a first direction along the optical axis that is opposite to a second direction of the shift of the center of gravity of the one or more movable lens groups.

In another exemplary embodiment of the disclosed methods, balancing the center of gravity comprises maintaining the shift of the center of gravity of the one or more movable lens groups within a predetermined range.

In another exemplary embodiment of the disclosed methods, maintaining the shift of the center of gravity comprises maintaining the shift of the center of gravity within a range of predetermined percentages of a length of the lens barrel.

In another exemplary embodiment of the disclosed methods, the predetermined percentages are less than or equal to thirty percent.

In another exemplary embodiment of the disclosed methods, balancing the center of gravity comprises cooperating an external weight with the cam barrel to balance the center of gravity of the one or more movable lens groups.

In another exemplary embodiment of the disclosed methods, balancing the center of gravity comprises balancing the center of gravity at selected positions along the optical axis.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available approaches for balancing a center of gravity of an imaging device are complex and require additional weight and a dedicated motor, a system and method for balancing the center of gravity of a lens barrel having one or more lens groups via a component of the lens barrel can prove desirable and provide a basis for a wide range of applications such as imaging systems, including aerial imaging systems. This result can be achieved, according to one embodiment as shown in FIG. 1.

Figure 1:
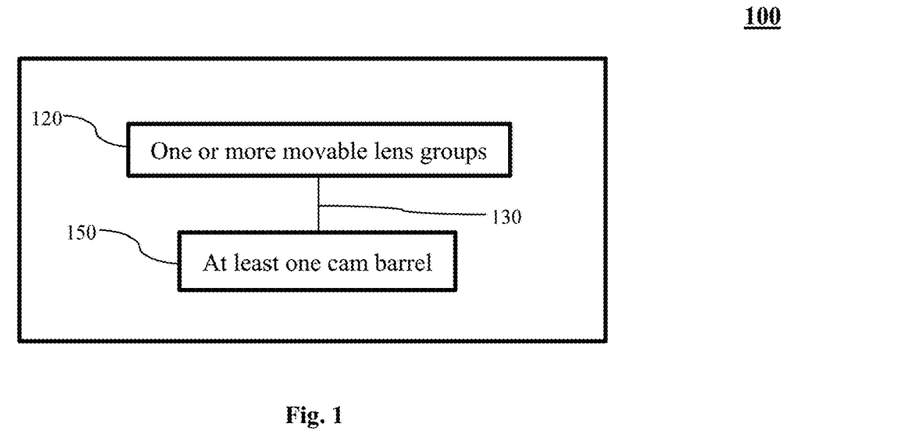
FIG. 1 is an exemplary top-level block diagram illustrating an exemplary lens barrel, wherein the lens barrel has one or more lens groups and a cam barrel being associated with the one or more lens groups.

FIG. 1 illustrates an exemplary embodiment of a lens barrel 100. Turning to FIG. 1, the lens barrel 100 has one or more lens groups 120 and a cam barrel 150 being associated with the one or more lens groups 120. At least one of the one or more lens groups 120 can be movable. In FIG. 1, the lens barrel 100 can be a zoom lens that can provide various focal lengths for capturing images of scenes in various distances.

The lens barrel 100, for example, can include three or four lens groups 120 without limitation. The lens groups 120 can be groupings of lens elements 131-138 (shown in FIG. 4). The lens elements 131-138 of each lens groups 120 can be coupled together and thereby operate as a unit. For example, the lens elements 131-138 of each lens groups 120 can be cemented together using optically transparent glue. The lens elements 131-138 are individual pieces of optical material used in the construction of lenses. Each of the one or more lens groups 120 can have a predetermined mass (or weight) and thus can exert a force along an optical axis 125 (shown in FIG. 2) of the lens barrel 100.

Although shown and described as cemented together using optically transparent glue for purposes of illustration only, the lens elements 131-138 can be coupled together to form the lens groups 120 via any other suitable means, e.g., via transparent tapes.

Figure 2:
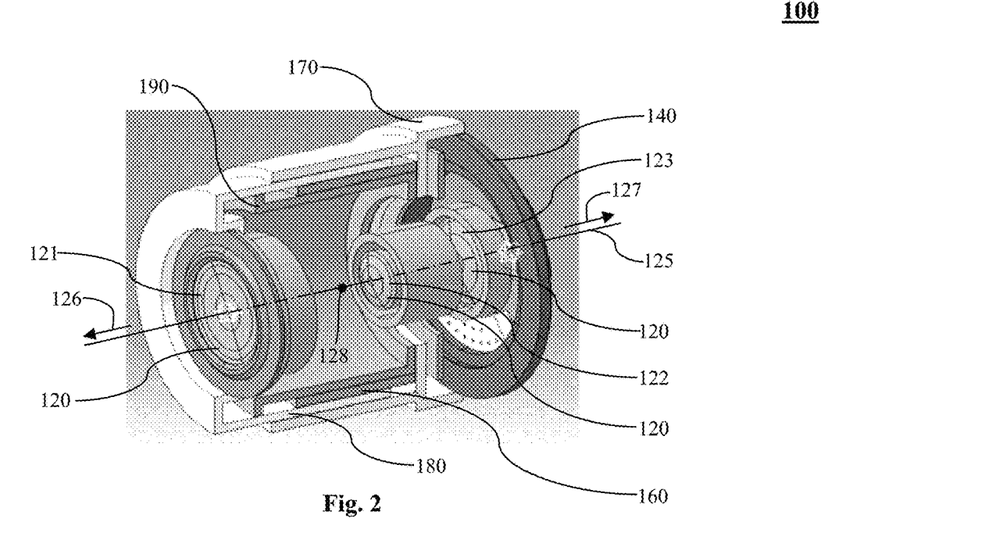
FIG. 2 is an exemplary detail diagram illustrating an embodiment of the lens barrel of FIG. 1, wherein the lens barrel has three lens groups and a cam barrel.

The lens barrel 100 (and/or the one or more lens groups 120) can have a center of gravity (or a center of mass) 128 (shown in FIG. 2). The center of gravity 128 of the lens barrel 100 can refer to a specific point at which an entire weight of the lens barrel 100 can be considered as concentrated for purposes of calculating a torque along the optical axis 125. When the lens barrel 100 is supported at this specific point, the lens barrel 100 can remain in equilibrium along the optical axis 125. In other words, when the lens barrel 100 is supported at the center of gravity 128, the lens barrel 100 applies no rotation force about the specific point.

Each of the one or more lens groups 120 can move along the optical axis 125 of the lens barrel 100. When the one or more lens groups 120 move, distances between the lens groups 120 can change. Additionally and/or alternatively, a distance between one lens group 120 and an end of the lens barrel 100, for example, a coupling end of the lens barrel 100, can change when the one or more lens groups 120 move along the optical axis 125. Such change can shift the center of gravity 128 of the one or more lens groups 120, and thus, the center of gravity of the lens barrel 100.

The shift of center of gravity 128 can be an issue when the lens barrel 100 is coupled with an imaging device 500 via a supporting device, for example a gimbal 526 (collectively shown in FIG. 14), because the shift can cause an undesired action of the supporting device.

For purposes of balancing the center of gravity 128 of the lens barrel 100 (or the one or more lens groups 120), the lens barrel 100 advantageously can include at least one cam barrel 150. Each cam barrel 150 can be provided to negate, or to offset, the shift of center of gravity 128 of the one or more lens groups 120. Each cam barrel 150 can be a barrel shape component that is associated, at 130, with the one or more lens groups 120. Each cam barrel 150 can have a predetermined weight that can negate the shift of center of gravity 128 when the lens barrel 100 zooms in or zooms out. Each cam barrel 150 can move, in a predetermined manner, in response to a movement of the one or more lens groups 120 for purposes of balancing the center of gravity 128 of the one or more lens groups 120.

Although shown and described as using the at least one cam barrel 150 for balancing the center of gravity 128 for purposes of illustration only, other suitable balancing devices (not shown) can be also used in addition to the cam barrel 150, e.g., providing an additional balance weight. The additional balance weight can move along the optical axis 125 in a controllable manner. The cam barrel 150 advantageously enables the additional balance weight to be limited in size and/or weight.

FIG. 2 illustrates an embodiment of the exemplary lens barrel 100. Turning to FIG. 2, the lens barrel 100 is shown as having three lens groups 120 and a cam barrel 160 for balancing the center of gravity 128. In FIG. 2, the three lens groups 120 can include a first lens group 121, a second lens group 122 and a third lens group 123. At least one of the three lens groups 120 can be a movable lens group. The three lens groups 120 can be arranged coaxially along an optical axis 125 that can be a line going through the respective centers of the lens groups 120. Each of the lens groups 120 can be provided to refract light entering into the lens barrel 100 in a predesigned manner.

A predetermined distance can be provided between each pair of adjacent lens groups 120. For example, a first predetermined distance can exist between the first lens group 121 and the second lens group 122, and a second predetermined distance can exist between the second lens group 122 and the third lens group 123. The center of gravity 128 of the three lens groups 120 can be located at certain point of the optical axis 125.

Alternatively and/or additionally, the lens barrel 100 can comprise an extendible barrel 180 for facilitating movements of one or more of the lens groups 120. For example, the extendible barrel 180 can be associated with the first lens group 121 for enabling the first lens group 121 to move in a first direction 126 or in a second direction 127. The extendible barrel 180 can be made of any suitable materials, including, but not limited to, plastic and metallic materials. The extendible barrel 180 can cooperate with at least one stationary barrel 190 for providing extension and/or retraction movements of the lens group 120 with which the extendible barrel 180 is associated.

The stationary barrel 190 can be at least partially associated with an inner surface of the extendible barrel 180 and can be made of any suitable materials. At least a partial annular space can be formed between the extendible barrel 180 and the stationary barrel 190. Although shown and described as being associated with the inner surface of the extendible barrel 180 for purposes of illustration only, the stationary barrel 190 can alternatively be at least partially associated with an outer surface of the extendible barrel 180.

When the lens barrel 100 is operated for zooming, either zoom in or zoom out, at least one of the lens groups 120 can move along the optical axis 125 in the first direction 126 and/or in the second direction 127. The first direction 126 can be an opposite direction of the second direction 127. When the at least one lens group 120 moves, the center of gravity 128 can shift along the optical axis 125 accordingly. The shift of center of gravity 128 can be an issue when the lens barrel 100 is associated with a supporting device, for example a gimbal 526 (shown in FIG. 14). For example, the shift of center of gravity 128 can generate an unwanted variable torque to the gimbal 526, which can be undesirable for controlling the gimbal 526.

Although shown and described as including three lens groups 120 for purposes of illustration only, the lens barrel 100 can include any suitable number of lens groups 120 for fulfilling zooming functions. Alternatively and/or additionally, one of the lens groups 120, for example the third lens group 123, can be movable for purposes of conducting a focusing operation and/or a zooming operation.

For purposes of negating (or offsetting) the undesirable shift of the center of gravity 128, as shown and described with reference to FIG. 1, at least one cam barrel 160 can be provided in response to the shift of the center of gravity 128. The cam barrel 160 can be made of any suitable materials, including, but not limited to, metallic, nonmetallic, plastic materials and the like. For maintaining the center of gravity 128 of the three lens groups 120, the cam barrel 160 can move in a direction that is opposite to the direction of the shift of the center of gravity 128. For example, when the center of gravity 128 shifts in the first direction 126 along the optical axis 125 due to movement of the lens groups 120, the cam barrel 160 can move in the second direction 127. A shift of position of the cam barrel 160 can at least partially, if not entirely, maintain the center of gravity 128 in a desired position.

Alternatively and/or additionally, the lens barrel 100 can include at least one outer barrel 170. The outer barrel 170 can protect other components of lens barrel 100 by housing the components of the lens barrel 100 in an at least partially, and in some embodiments totally, sealed compartment. The outer barrel 170 can be stationary relative to an imaging device 500 (shown in FIG. 14) and can be made of any suitable materials, including, but not limited to, metallic, nonmetallic, plastic materials and the like.

Although shown and described as being the center of gravity 128 of the one or more lens groups 120 for purposes of illustration only, the center of gravity 128 can include other components of the lens barrel 100, e.g., the extendible barrel 180, the outer barrel 170, the stationary barrel 190 and the like. In some embodiments, an effect on the center of gravity 128 by the extendible barrel 180 can be included in the lens group 120 that the extendible barrel 180 is associated with, e.g., the first lens group 121.

Figure 3:
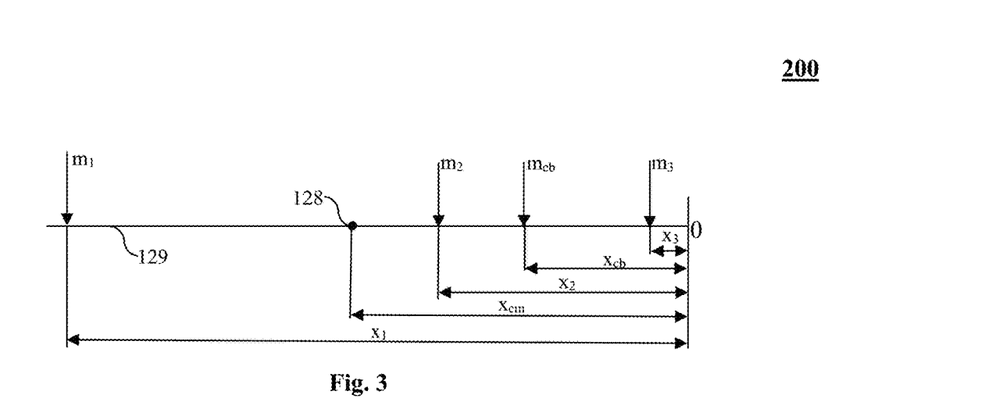
FIG. 3 is an exemplary detail graph illustrating a method for calculating a center of gravity of the lens barrel of FIG. 2, wherein four weights are distributed along an axis of the lens barrel.

FIG. 3 illustrates an embodiment of an exemplary graph 200 for calculating a center of gravity 128. Turning to FIG. 3, four weights $m_1$, $m_2$, $m_3$ and $m_{cb}$ are shown as being distributed along an axis 129. In FIG. 3, the center of gravity 128 is shown as falling in between the first weight $m_1$ and the second weight $m_2$. The first weight $m_1$ can represent a weight of a first lens group 121; the second weight $m_2$ can represent a weight of a second lens group 122; the third weight $m_3$ can represent a weight of a third lens group 123; and the fourth weight mob can represent a weight of a cam barrel 160 (collectively shown in FIG. 2).

Alternatively and/or additionally, a first distance $x_1$ can represent a distance between the first lens group 121 and an end point, for example, a coupling end, of a lens barrel 100 (shown in FIG. 2). A second distance $x_2$ can represent a distance between a center of mass of the second lens group 122 and the end point, a third distance $x_3$ can represent a distance between a center of mass of the third lens group 123 and the end point, and a fourth distance $x_{cb}$ can represent a distance between a center of mass of the cam barrel 160 and the end point.

A distance between the center of gravity 128 and the end point of the lens barrel 100 can be calculated via the following equation:

$$x_{cm} = \Sigma_{i=1}^{n} m_i x_i / \Sigma_{i=1}^{n} m_i \qquad \text{Equation (1)}$$

wherein, n represents a total number of weights; $\Sigma_{i=1}^{n} m_i$ represents a sum of all weights; $\Sigma_{i=1}^{n} m_i x_i$ represents a sum (or total) of torques generated by all of the weights.

Applying Equation (1) to FIG. 3, the distance $x_{cm}$ can be calculated as:

$$x_{cm} = (m_1 x_1 + m_2 x_2 + m_3 x_3 + m_{cb} x_{cb})/(m_1 + m_2 + m_3 + m_{cb}) \qquad \text{Equation (2)}$$

The weights $m_1$, $m_2$, $m_3$ and $m_{cb}$ can be constants, and a sum of the weights $m_1$, $m_2$, $m_3$ and $m_{cb}$ can be represented as M. The distances $x_1$, $x_2$, $x_3$, $x_{cb}$ can be variables. Equation (2) can be rewritten as:

$$m_{cb} x_{cb} = x_{cm} M - (m_1 x_1 + m_2 x_2 + m_3 x_3) \qquad \text{Equation (3)}$$

wherein, $(m_1x_1+m_2x_2+m_3x_3)$ is a sum of all torques generated by the lens groups. Therefore, for purposes of generalization, Equation (3) can be rewritten into:

$$m_{cb}x_{cb}=x_{cm}M-\Sigma_{i=1}^{n-1}m_ix_i \qquad \text{Equation (4)}$$

In Equation (4), in order to balance the center of gravity 128, $x_{cm}M$ can be invariable. Therefore, when the sum $\Sigma_{i=1}^{n-1} m_ix_i$ changes, $m_{cb}x_{cb}$ can be adjusted to negate the change in the sum $\Sigma_{i=1}^{n-1} m_ix_i$. In addition, because mob is a constant, $x_{cb}$ can change in response to a change in the sum $\Sigma_{i=1}^{n-1} m_ix_i$. In some embodiments, the change in the sum $\Sigma_{i=1}^{n-1} m_ix_i$ can be a result of a movement of one or more of the movable lens groups 120, e.g., the first lens group 121, the second lens group 122 and/or the third lens group 123. The cam barrel 150 can move to create a torque, the change of $m_{cb}x_{cb}$, for negating change of the sum of torques $\Sigma_{i=1}^{n-1} m_ix_i$.

When the sum of the torques $\Sigma_{i=1}^{n-1} m_ix_i$ tends to move the center of gravity 128 to a first direction, the torque change of the cam barrel $m_{cb}x_{cb}$ can respond by moving in a second direction that is opposite to the first direction.

Although shown and described as the center of gravity 128 for each of the lens groups 120 as concentrated mass for purposes of illustration only, the mass position for each of the lens groups 120 can be changed when zooming in or zooming out. In such cases, the center of mass change for the lens groups 120 can be included in the position change of the lens group 120.

Figure 4:
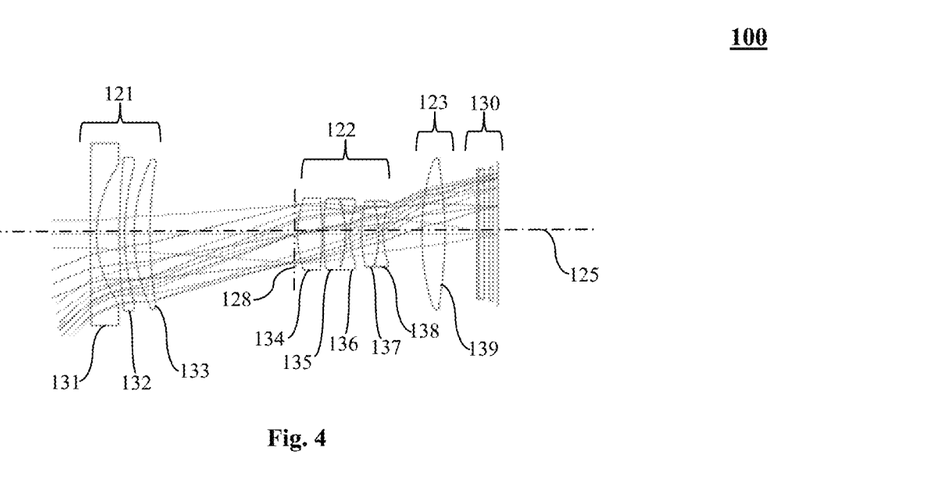
FIG. 4 is an exemplary detail diagram illustrating an alternative embodiment of the lens barrel of FIG. 2, wherein the three lens groups are in a wide position.

FIG. 4 illustrates an embodiment of an exemplary lens barrel 100. Turning to FIG. 4, the lens barrel 100 includes three lens groups 121, 122, 123 that are in a wide position. In FIG. 4, at least one of a first lens group 121, a second lens group 122 and a third lens group 123 can be movable for conducting a zooming operation. In some embodiments, all of the three lens groups 121, 122, 123 can be movable. A movement of the three lens groups 121, 122, 123 can be measured relative to an end of the lens barrel 100, for example a coupling end, and/or can be measured relative to the respective positions of the lens groups 120. Alternatively and/or additionally, the movement of the three lens groups 121, 122, 123 can be measured relative to a stationary component, for example, an imaging sensor (or image sensor) 130 of an imaging device 500 (shown in FIG. 14).

The imaging sensor 130 can detect and convert variable attenuation of waves received via the lens barrel 100 into signals that constitute an image. The waves can be light or another form of electromagnetic radiation. The imaging sensor 130 can be any type of imaging sensor, including, but not limited to, an analog sensor and/or a digital sensor. The imaging sensor 130 can be positioned within an imaging device coupled with the lens barrel 100.

The first lens group 121 can be a fixed or movable lens group and can include one or more lens elements. As shown in FIG. 4, the first lens group 121 can include three lens elements 131, 132, 133. The three lens elements 131, 132, 133 can be arranged coaxially along an optical axis 125 of the lens barrel 100. Each of the three lens elements 131, 132, 133 can be designed to refract light that enters into the lens barrel 100 in a predetermined manner. The three lens elements 131, 132, 133 can collectively refract the light in a predesigned pattern so as to cooperate with the other lens groups 122, 123 to form a desired image on the imaging sensor 130.

The second lens group 122 can be a fixed or movable lens group and can include one or more lens elements. As shown in FIG. 4, the second lens group 122 can include five lens elements 134, 135, 136, 137, 138. The five lens elements 134, 135, 136, 137, 138 can be arranged coaxially along the optical axis 125. Each of the five lens elements 134, 135, 136, 137, 138 can be designed to refract light that enters through the first lens group 121 in a predetermined manner. The five lens elements 134, 135, 136, 137, 138 can collectively refract the light in a predesigned pattern so as to cooperate with the other lens groups 121, 123 to form a desired image on the imaging sensor 130.

The third lens group 123 can be a fixed or movable lens group and can include one or more lens elements. As shown in FIG. 4, the third lens group 123 can include one lens element 139. The one lens element 139 can be arranged coaxially with the other two lens groups 121, 122 along the optical axis 125. The one lens element 139 can be designed to refract light that enters through the first lens group 121 and the second lens group 122 in a predetermined manner. The one lens element 139 can refract the light in a predesigned pattern so as to cooperate with the other lens groups 121, 122 to form a desired image on the imaging sensor 130.

Although shown and described as using three lens groups 121, 122, 123 having three, five and one lens elements respectively for purposes of illustration only, the lens barrel 100 can have any suitable number of lens groups, each having a suitable number of lens elements, respectively. Alternatively and/or additionally, any of the lens groups, for example, the third lens group 123, can move for purposes of conducting a focusing operation and/or a zooming operation.

Figure 5:
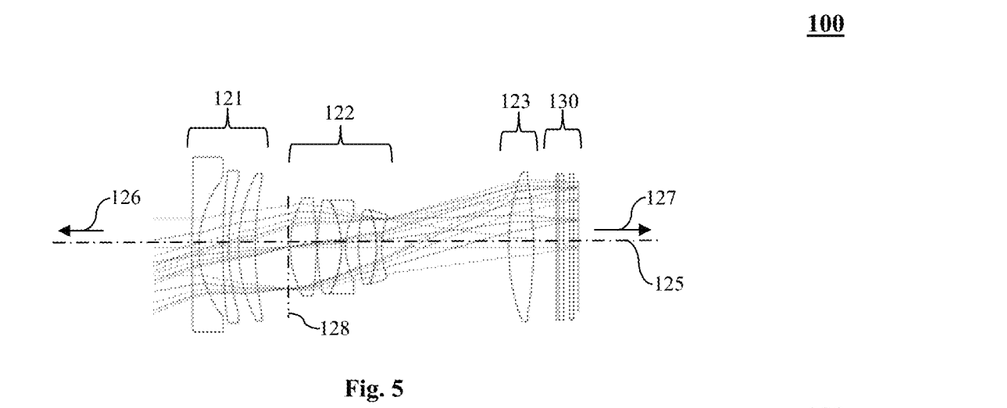
FIG. 5 is an exemplary detail diagram illustrating the alternative embodiment of the lens barrel of FIG. 2, wherein the lens barrel is in a tele position.

For purposes of zooming, the lens groups 121, 122, 123 can individually and/or cooperatively move along the optical axis 125 as shown in FIG. 5.

FIG. 5 illustrates an alternative embodiment of the exemplary lens barrel 100. Turning to FIG. 5, the lens barrel 100 of FIG. 2 is in a tele position. In FIG. 5, the lens barrel 100 can include three lens groups 121, 122, 123. At the tele position, the first lens group 121 can have a movement, relative to a wide position of the first lens group 121, in a second direction 127 along an optical axis 125. The second lens group 122 can have a movement, relative to a wide position of the second lens group 122, in a first direction 126, opposite the second direction 127, along the optical axis 125. The third lens group 123 can have a movement, relative to a wide position of the third lens group 123, in the second direction 127.

The above-recited movements of the three lens groups 121, 122, 123 are for purposes of illustration only. In some other embodiments, the three lens groups 121, 122, 123 can have movements in other patterns when the lens barrel 100 is zoomed between the wide position and the tele position.

Figure 6:
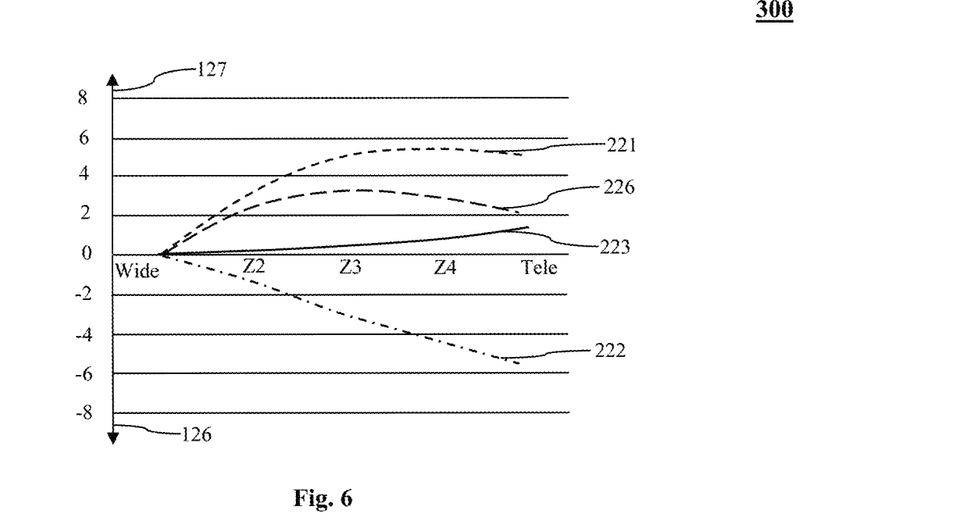
FIG. 6 is an exemplary graph illustrating exemplary movements of the lens groups of FIG. 4, wherein position shifts of each of the lens groups are shown as the lens barrel zooms between a wide position and a tele position.

As shown and described herein, when the lens barrel 100 zooms in or out, each of the lens groups 121, 122, 123 can move accordingly. FIG. 6 illustrates an embodiment of exemplary movement curves 300 of the lens barrel 100. Turning to FIG. 6, position shifts of each of the lens groups 121, 122, 123 are shown as the lens barrel 100 zooms between a wide position and a tele position.

In FIG. 6, when the lens barrel 100 is in the wide position, the three lens groups 121, 122, 123 can be in their original positions, or position zeros, respectively. When the lens barrel 100 zooms from the wide position to the tele position, the first lens group 121 can move in a second direction 127 as shown by a movement curve 221. The movement in the second direction 127 can be represented by positive numbers. For example, when the lens barrel 100 zooms from the wide position to a Z2 position, the first lens group 121 can move from 0 to an approximate to a 3 mm position. When the lens barrel 100 zooms from Z2 to Z3, the first lens group 121 can move from the 3 mm position to an approximate 5 mm position. When the lens barrel 100 zooms from Z3 to Z4, the first lens group 121 can move up to approximately a 5.5 mm position. When the lens barrel 100 zooms from Z4 to the tele position, the first lens group 121 can move back to an approximate 5.2 mm position.

Similarly, when the lens barrel 100 zooms from the wide position to the tele position, the third lens group 123 can move in the second direction 127 as shown by the movement curve 223. For example, when the lens barrel 100 zooms from the wide position through Z2, Z3, Z4 to the tele position, the third lens group 123 can move from 0 to a 0.2 mm position, to a 0.5 mm position, to a 0.9 mm position and then to an approximate 1.75 mm position, respectively.

In contrast, when the lens barrel 100 zooms from the wide position to the tele position, the second lens group 122 can move in a first direction 126 as shown by the movement curve 222. For example, when the lens barrel 100 zooms from the wide position through Z2, Z3, Z4 to the tele position, the second lens group 122 can move from 0 to a −1.4 mm position, to a −2.85 mm position, to a −4.3 mm position and then to an approximately −5.75 mm position, respectively.

When the three lens groups 121, 122, 123 move in the manner illustrated in FIG. 5, a center of gravity 128 of the three lens groups 121, 122, 123 can move accordingly as shown by the movement curve 226. According to the movement curve 226, the center of gravity 128 can shift in the second direction 127 as the lens groups 121, 122, 123 move from the wide position to the Z3 position and shift in the first direction 126 as the lens groups 121, 122, 123 move from the Z3 position to the tele position.

Although shown and described as zooming from the wide position to the tele position for purposes of illustration only, the lens groups 121, 122, 123 and the center of gravity 128 can follow the same movement curves 211, 222, 223, 226 when the lens barrel 100 zooms from the tele position to the wide position.

Figure 7:
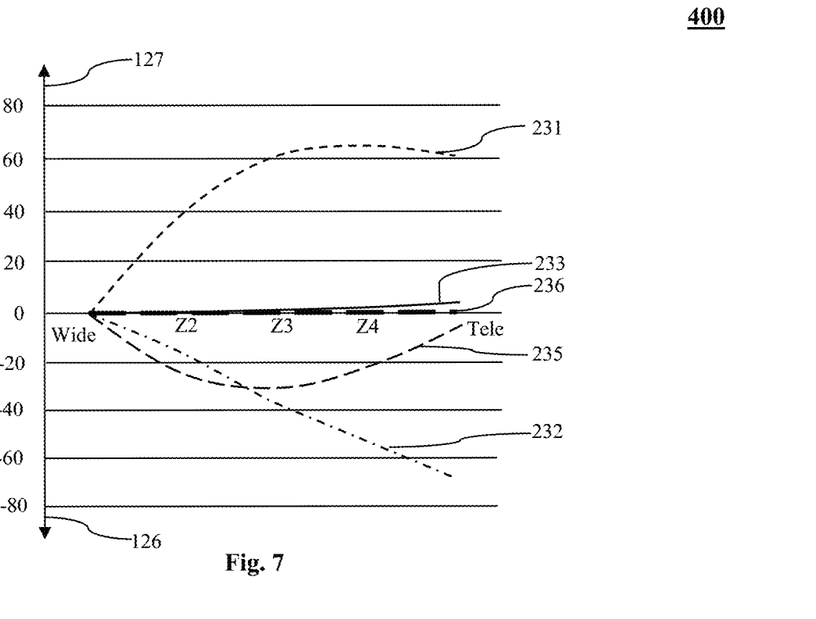
FIG. 7 is an exemplary graph illustrating exemplary torques of the lens groups of FIG. 4, wherein a cam barrel moves with a torque curve to balance the shift of the center of gravity.

FIG. 7 illustrates an embodiment of exemplary torque curves 400 of the lens barrel 100. Turning to FIG. 7, a cam barrel 160 (shown in FIG. 2) can move with a torque curve 235 to balance the shift of the center of gravity 128 of the lens groups 121, 122, 123. In FIG. 7, for purposes of balancing the shift of center of gravity 128 as indicated by a torque curve 236, the cam barrel 160 can move in according to the torque curve 235.

According to Equation (4), a contribution to the shift of the center of gravity 128 can be measured in a torque generated by a movement of a lens group 120 (shown in FIG. 2), e.g., $m_i x_i$, wherein $m_i$ represents a mass (or weight) of the lens group 120, and $x_i$ refers to a position shift of the lens group 120 relative to the position of the lens group 120 at the wide position. In one example, the masses of each of the lens groups 120 can be as follows respectively:

TABLE 1

| First lens group 121 | Second lens group 122 | Third lens group 123 | Cam barrel 160 |
|---|---|---|---|
| 11.8 g | 6.0 g | 1.8 g | 5.4 g |

FIG. 7 illustrates torque changes of each of the lens groups 120 when the lens groups 120 move in accordance to the movement curves of FIG. 6. For example, at the tele position, the first lens group 121 can have a position shift of approximate 5.2 mm according to the movement curve 221 of FIG. 6.

In FIG. 7, the torque change of the first lens group 121 at the tele position can be $m_1 x_1$=11.8 g×5.2 mm=61.36 gf-mm. Accordingly, the torque change of the second lens group 122 can be $m_2 x_2$=6 g×(−5.75) mm=−34.5 gf-mm; the torque change of the third lens group 123 can be $m_3 x_3$=1.8 g×1.75 mm=3.15 gf-mm. Therefore, a total of 61.36−34.5+3.15=30.01 gf-mm of torque change can be generated by the three lens groups 121, 122, 123, when the lens barrel 100 is at the tele position. To balance the total torque change generated by the three lens groups 121, 122, 123, the cam barrel 160 can have a position shift of approximate −5.56 mm, which generates $m_{cb} x_{cb}$=5.4 g×(−5.56) mm=−30.02 gf-mm of balancing torque, resulting an negligible −0.01 gf-mm of torque change. Therefore, the center of gravity 128 can be maintained at an approximate unchanged position.

When the lens barrel 100 zooms from the wide position to the tele position, the torque change $m_1 x_1$ of the first lens group 121 can follow a torque change curve 231, the torque change $m_2 x_2$ of the second lens group 122 can follow a torque change curve 232, and the torque change $m_3 x_3$ of the third lens group 123 can follow a torque change curve 233. The torque change $m_{cb} x_{cb}$ of the cam barrel 160 can follow a torque change curve 235 for negating the total of the torque changes $\Sigma_{i=1}^{3} m_i x_i$.

The movement of the cam barrel 160 can effectively negate the shift of the center of gravity 128. As a result of the negation by the cam barrel 160 via the torque curve 235, the shift of the center of gravity 128 can be contained to a predetermined torque range as indicated with the total torque change curve 236. In some embodiments, the total torque change curve 226 can be a flat line, meaning the center of gravity 128 can be maintain at an effectively unchanged position when the lens barrel 100 zooms from the wide position to the tele position.

In some other embodiments, the position of the center of gravity 128 can be allowed to shift even with the negation of the cam barrel 160. In such cases, the shift of the center of gravity 128 can be maintained within a predetermined shift range, e.g., a predetermined percentage of a length of the lens barrel 100. In some embodiments, the predetermined percentage can be not greater than thirty percent and, in some embodiments, not greater than fifteen percent.

Although shown and described as being zooming from the wide position to the tele position for purposes of illustration only, the torque curves 231, 232, 233, 235, 236 can also be applicable for situations when the lens barrel 100 zooms from the tele position to the wide position.

Figure 8:
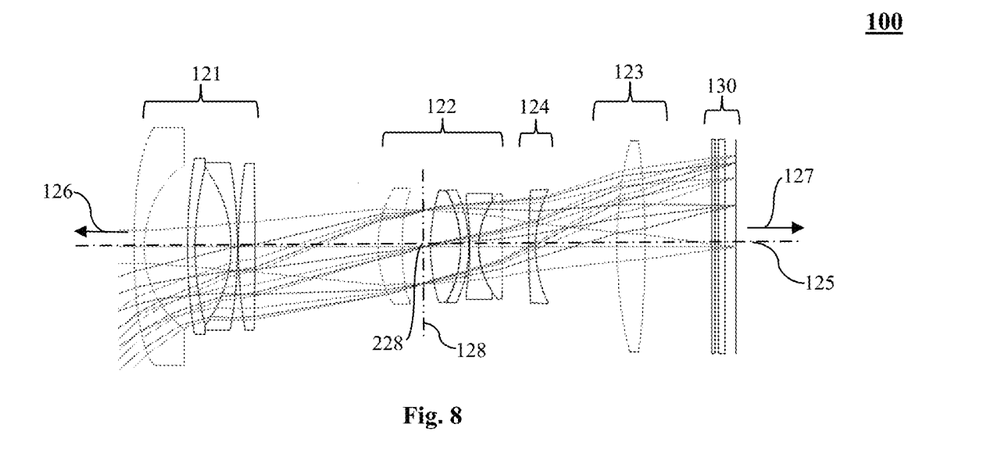
FIG. 8 is an exemplary detail diagram illustrating an alternative embodiment of the lens barrel of FIG. 1, wherein four lens groups of the lens barrel are in a wide position.

FIG. 8 illustrates an alternative embodiment of the exemplary lens barrel 100. Turning to FIG. 8, the lens barrel 100 is shown as including four lens groups 121, 122, 123, 124. The lens barrel 100 is shown as being in a wide position. In FIG. 8, the four lens groups 121, 122, 123, 124 can be arranged coaxially along an optical axis 125. Each of the lens groups 121, 122, 123, 124 can be designed to refract light that enters into the lens barrel 100 in a predetermined manner. For purposes of zooming the lens barrel 100, at least one of the four lens groups 121, 122, 123, 124 can be movable.

A first lens group 121 is illustrated in FIG. 8 as including four lens elements and can be a stationary lens group. In some embodiments, when the lens barrel 100 zooms, a distance between the first lens group 121 and an imaging sensor 130 can remain unchanged. The imaging sensor 130 can be a component of an imaging device 500 (shown in FIG. 14) for forming an image of a scene with the light passes the four lens groups 121, 122, 123, 124. At the wide position, a center of gravity 128 of the four lens groups 121, 122, 123, 124 can be at a position 228.

A second lens group 122, a third lens group 123 and a fourth lens group 124 each can be a movable lens group. When the lens barrel 100 zooms, one or more of the three lens groups 122, 123, 124 can move in a first direction 126 or in a second direction 127 along the optical axis 125. Movement of the three lens groups 122, 123, 124 can cause the center of gravity 128 being shifted away from the position 228.

Although shown and described as being three movable lens groups 122, 123, 124 and one stationary lens group 126 for purposes of illustration only, the lens barrel 100 can include any suitable number of movable lens groups and/or any suitable number of stationary lens groups.

Figure 9:
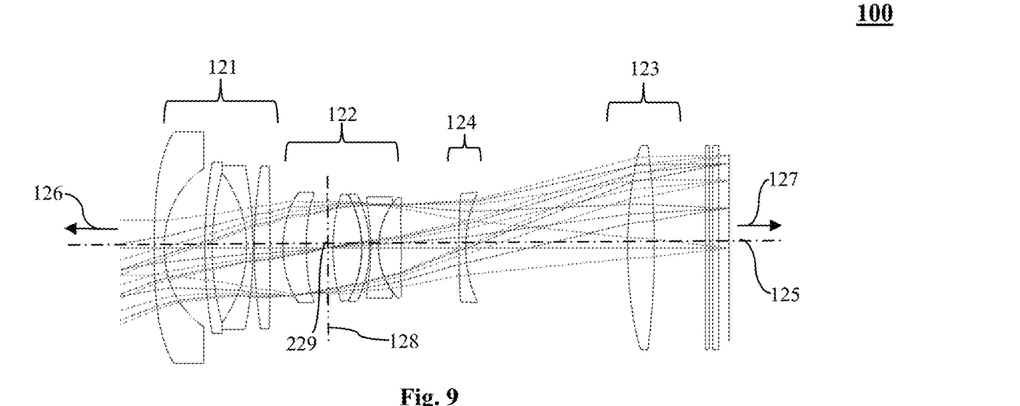
FIG. 9 is an exemplary schematic diagram illustrating the alternative embodiment of the lens barrel of FIG. 1, wherein four lens groups of the lens barrel are in a tele position.

FIG. 9 illustrates the alternative embodiment of the exemplary lens barrel 100. Turning to FIG. 9, the lens barrel 100, having the four lens groups 121, 122, 123, 124, is in a tele position. In FIG. 9, when the lens barrel 100 zooms from the wide position (shown in FIG. 8) to the tele position, a first lens group 121 can remain stationary.

When the lens barrel 100 zooms to the tele position, a second lens group 122 and a fourth lens group 124 can move in a first direction 126 along an optical axis 125, and a third lens group 123 can move in a second direction 127 along the optical axis 125. The center of gravity 128 of the lens groups 121, 122, 123, 124 can shift from the position 228 (shown in FIG. 8), for example, to a position 229.

In some other embodiments, each of the four lens groups 121, 122, 123, 124 can move in any other suitable manner to perform the zoom functionalities. In such cases, the center of gravity 128 of the lens groups 121, 122, 123, 124 can shift in other corresponding manners.

Figure 10:
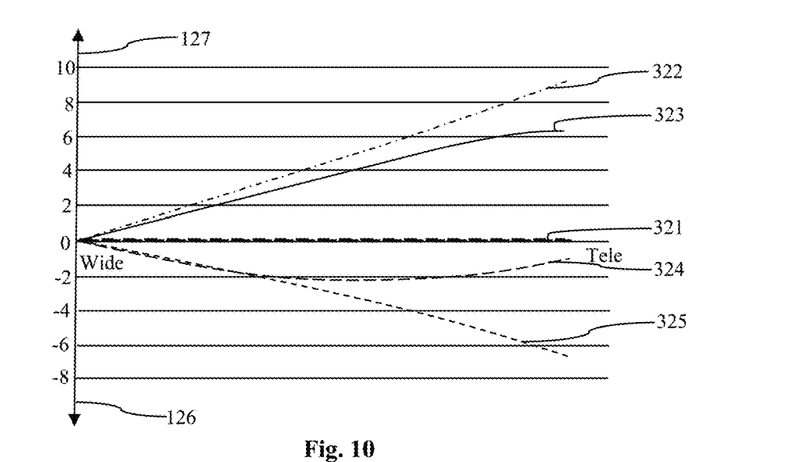
FIG. 10 is an exemplary graph illustrating exemplary movement curves of the lens groups of FIG. 8, wherein position shifts of each of the lens groups are shown as the lens barrel zooms between a wide position and a tele position.

FIG. 10 illustrates an embodiment of exemplary movement curves 300 of the lens barrel 100. Turning to FIG. 10, each of the movement curves 321, 322, 323, 324, 325 can correspond to a movement of the four lens groups 121, 122, 123, 124 and the cam barrel 160 of FIG. 9 respectively. In FIG. 10, when the lens barrel 100 zooms between a wide position and a tele position, the first lens group 121 can be stationary as indicated by the movement curve 321.

When the lens barrel 100 zooms from the wide position to the tele position, the second lens group 122 and the third lens group 123 can move in the second direction 127 according to a movement curve 322 and a movement curve 323 respectively. In contrast, the fourth lens 124 can move in the first direction 126 according to a movement curve 324. The first direction 126 can be an opposite direction of the second direction 127. For purposes of balancing the movements of the second lens group 122, the third lens group 123 and the fourth lens group 124, the cam barrel 160 can move in accordance to a movement curve 325.

The movement curves 321, 322, 323, 324 of the four lens groups 121, 122, 123, 124 are exemplary. In some embodiments, other suitable movement curves can be applied to achieve various zooming operations. In such embodiments, the movement curve 325 for the cam barrel 160 can be designed according to a requirement of balancing the center of gravity 128 (shown in FIG. 9).

Alternatively and/or additionally, when the lens barrel 100 zooms from the tele position to the wide position, the movement curves 321, 322, 323, 324, 325 can be also be applied.

Figure 11:
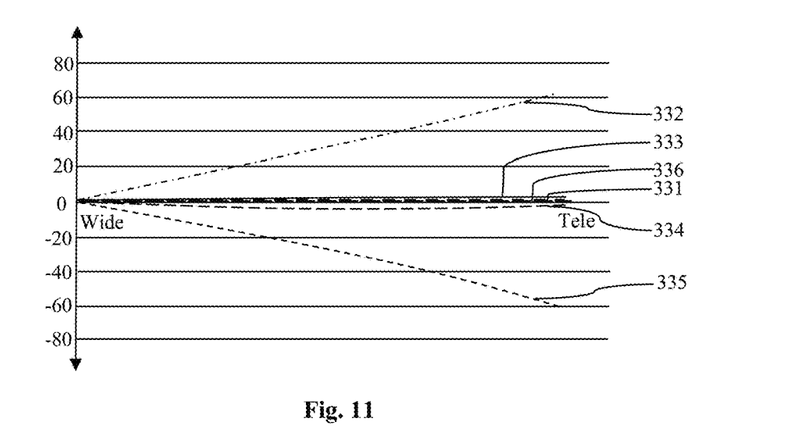
FIG. 11 is an exemplary graph illustrating exemplary torque curves of the lens groups of FIG. 8, wherein a cam barrel moves with a torque curve to balance the shift of the center of gravity.

FIG. 11 illustrates an embodiment of exemplary torque curves 400 of the lens barrel 100. Turning to FIG. 11, the cam barrel 160 of FIG. 2 can move with a torque curve 335 to balance a shift of the center of gravity 128. In FIG. 11, contributions to the shift of the center of gravity 128 can be measured by torque changes. The torque changes caused by the movements of the first lens group 121, the second lens group 122, the third lens group 123 and the fourth lens group 124 can be shown as torque curves 331-335. The shift of the center of gravity 128 can be as zero or be controlled within a predetermined range.

When converted into torque changes as described herein, the torque change $m_1 x_1$ of the first lens group 121 can follow a torque change curve 331; the torque change $m_2 x_2$ of the second lens group 122 can follow a torque change curve 332; the torque change $m_3 x_3$ of the third lens group 123 can follow a torque change curve 333; and the torque change $m_3 x_3$ of the fourth lens group 124 can follow a torque change curve 334. The torque change $m_{cb} x_{cb}$ of the cam barrel 160 can follow a torque change curve 235 for negating a sum of the torque changes $\Sigma_{i=1}^{4} m_i x_i$ of the lens groups 121, 122, 123, 124. As a result of the negation by the cam barrel 160, the center of gravity 128 can be balanced as shown in FIG. 11 with a torque curve 336 that is approximate a flat line.

The torque curves 331 to 336 are constructed based on certain weights of the lens groups 121, 122, 123, 124 and the cam barrel 160. When the weights are varied, different torque curves of the lens groups 121, 122, 123, 124 can be formed, and a different torque curve 335 can be needed to negate the different torque curves.

Figure 12:
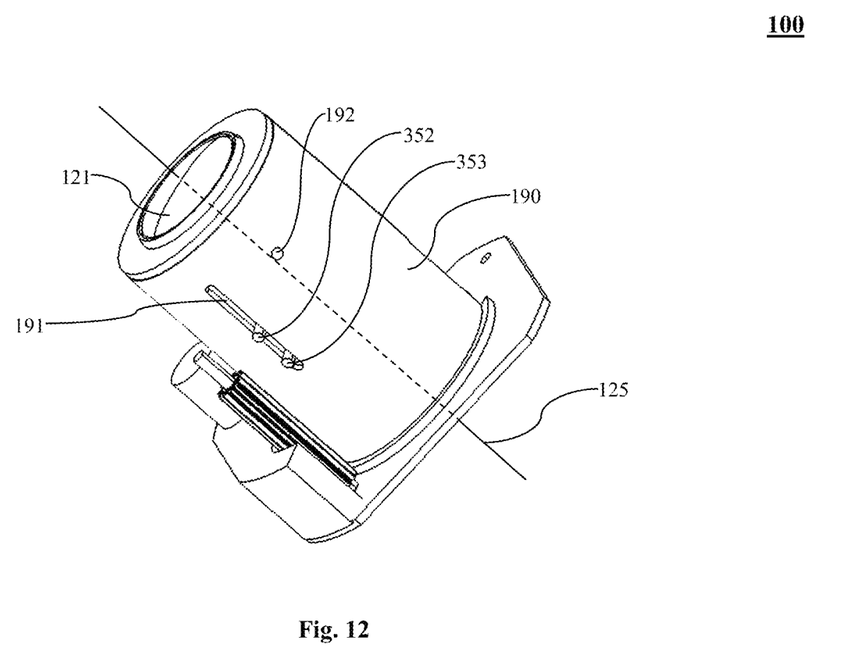
FIG. 12 is an exemplary detail diagram illustrating another alternative embodiment of the lens barrel of FIG. 1, wherein the lens barrel includes a stationary barrel.

FIG. 12 illustrates an alternative embodiment of the exemplary lens barrel 100. Turning to FIG. 12, a stationary barrel 190 of the lens barrel 100 forms at least one groove 191 for cooperating with at least one protruding part 352 projecting from a second lens group 122 and/or at least one protruding part 353 projecting from a third lens group 123 (shown in FIG. 8). The at least one groove 191 can be provided with any suitable size, shape or dimension and, as shown in FIG. 12, can comprise a straight groove. In FIG. 12, a first lens group 121 can be a stationary lens group that is coupled with the stationary barrel 190. The at least one groove 191 can be designed to guide one or more selected lens groups, for example, the second lens group 122 and/or the third lens group 123, to move along an optical axis 125 of the lens barrel 100.

In some embodiments, the at least one groove 191 can comprise two or more grooves 191 for guiding the lens groups 122, 123 to move along the optical axis 125. The protruding parts 352, 353 can be moved along the optical axis 125 by another barrel of the lens barrel 100, for example a cam barrel 160 (shown in FIG. 13). In some embodiments, the protruding parts 352, 353 and the at least one groove 191 can cooperate with predesigned means, for example, designed grooves of the cam barrel 160, to move the second lens group 122 and/or the third lens group 123.

Alternatively and/or additionally, the stationary barrel 190 can include at least one protruding part 192 for cooperating with the cam barrel 160. Because the stationary barrel 190 can remain stationary, the at least one protruding part 192 can cooperate with the cam barrel 160 via a predesigned groove, for example a first groove 161(shown in FIG. 13). In some embodiments, there be can be two or more protruding parts 192 for cooperating with the cam barrel 160 via two or more grooves 161 formed on the cam barrel 160. Additional detail regarding the cam barrel 160 will be provided below with reference to FIG. 13.

Although shown and described as being the three lens groups 121, 122, 123 with reference to FIG. 12 for purposes of illustration only, the lens barrel 100 can include any predetermined number of lens groups 120. For example, the lens barrel 100 can include a fourth lens group 124 (shown in FIG. 9) for cooperating the three lens groups 121, 122, 123 to conduct a zooming operation. In such embodiments, the fourth lens group 124 can be driven through other suitable means (not shown). Alternatively and/or additionally, the fourth lens group 124 can be used to conduct either a focusing operation and/or a zooming operation.

Figure 13:
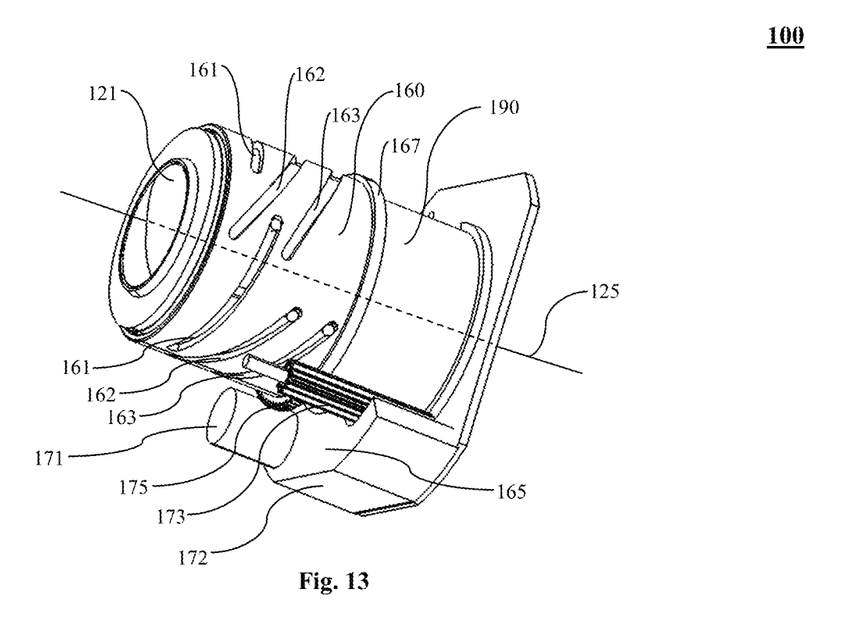
FIG. 13 is an exemplary detail diagram illustrating an alternative embodiment of the lens barrel of FIG. 12, wherein the cam barrel forms multiple grooves.

FIG. 13 illustrate another embodiment of the exemplary lens barrel 100. Turning to FIG. 13, the lens barrel 100 is shown as including a cam barrel 160 that forms multiple grooves 161, 162, 163 for cooperating the protruding parts 192, 352, 353 (shown in FIG. 12). In FIG. 13, a first lens group 121 can be coupled to a stationary barrel 190 and, thus, can be a stationary lens group.

The cam barrel 160 can include a driving mechanism 165 for driving the cam barrel 160. For example, the driving mechanism 165 can drive the cam barrel 160 to rotate about an optical axis 125 of the lens barrel 100. In some embodiments, the driving mechanism 165 can include a motor 171 for driving a transmission system 172. The motor 171 can be an electric motor driven by a direct current ("DC") or an alternative current ("AC") power source. The motor 171 can rotate in either a clockwise direction or a counterclockwise direction for driving the cam barrel 160 to rotate in either direction. The transmission system 172 can reduce a rotation speed of the motor 171 and can transmit the rotation force to a driving gear 173 at a reduced speed. The driving gear 173 can be a geared rod that engages with a driven gear 175. The driven gear 175 can be arranged on a collar 167 of the cam barrel 160. The driving gear 173 can drive the driven gear 175 for rotating the cam barrel 160 in either the clockwise direction or the counterclockwise direction. The rotation of the motor 171 can be controllable via a control system (not shown).

In some embodiments, the cam barrel 160 can include one or more grooves 161 for cooperating the one or more protruding parts 192 for driving the cam barrel 160. The one or more grooves 161 can be provided in predetermined slanted shapes. As shown and described herein, the one or more protruding parts 192 can be stationary because of an association with the stationary barrel 190. When the cam barrel 160 rotates, the one or more grooves 161, in cooperation with the one or more protruding parts 192, can guide the cam barrel 160 to move in either direction along the optical axis 125.

Although shown and described as the stationary barrel 190 including the one or more protruding parts 192 for cooperating the one or more grooves 161 of the cam barrel 160 for purposes of illustration only, the one or more protruding parts 192 can be provided with the cam barrel 160 for cooperating with one or more grooves 161 being formed on the stationary barrel 190.

The cam barrel 160 can include one or more grooves 162 for cooperating one lens group, for example, for cooperating a second lens group 122 via one or more protruding parts 352. The one or more grooves 162 can be in predesigned slanted shapes. When the cam barrel 160 rotates about the optical axis 125 and moves along the optical axis 125, the one or more grooves 162 can guide the one or more protruding parts 352 to move in either direction along the at least one groove 191 (shown in FIG. 12). Thereby, the second lens group 122 can move in either direction along the optical axis 125 in a predesigned pattern.

Alternatively and/or additionally, the cam barrel 160 can include one or more grooves 163 for cooperating one lens group, for example, for cooperating a third lens group 123 via one or more protruding parts 353. The one or more grooves 163 can be in predesigned slanted shapes. When the cam barrel 160 rotates about the optical axis 125 and moves along the optical axis 125, the one or more grooves 163 can guide the one or more protruding parts 353 to move in either direction along the at least one groove 191. Thereby, the third lens group 123 can move in either direction along the optical axis 125 in a predesigned pattern.

Although shown and described as having three lens groups 121, 122, 123 with reference to FIG. 13 for purposes of illustration only, the lens barrel 100 can include a fourth lens group 124 that can be movable while the lens barrel 100 zooms. The fourth lens group 124 can have a separate driving mechanism (not shown) that can cooperate with the movements of the three lens groups 121, 122, 123. Alternatively and/or additionally, the fourth lens group 124 can be used to conduct a focusing operation and/or a zooming operation.

Figure 14:
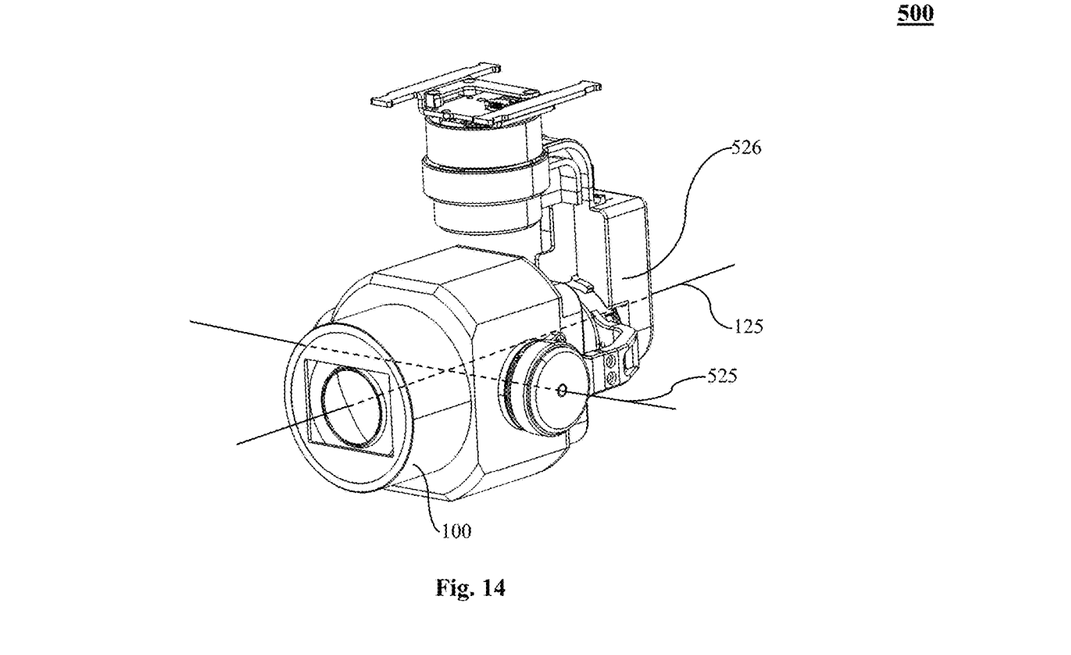
FIG. 14 is an exemplary detail diagram illustrating an exemplary embodiment of an imaging device, wherein the imaging device couples with the lens barrel of FIG. 1.

FIG. 14 illustrates an embodiment of an exemplary imaging device 500. Turning to FIG. 14, the imaging device 500 includes the lens barrel 100. In FIG. 14, a center of gravity 128 of the one or more lens groups 120 (collectively shown in FIG. 2) of a lens barrel 100 can be balanced at a position along an optical axis 125.

The lens barrel 100 can zoom in or zoom out via a movement of the one or more lens groups 120. The center of gravity 128 of the one or more lens groups 120 can be balanced in accordance to any one of the embodiment set forth herein. Thereby, the center of gravity of the lens barrel 100 can be maintained. No or little extra torque can be generated about a pitch axis 525 of the lens barrel 100 as the lens barrel 100 zooms in or out.

Figure 15:
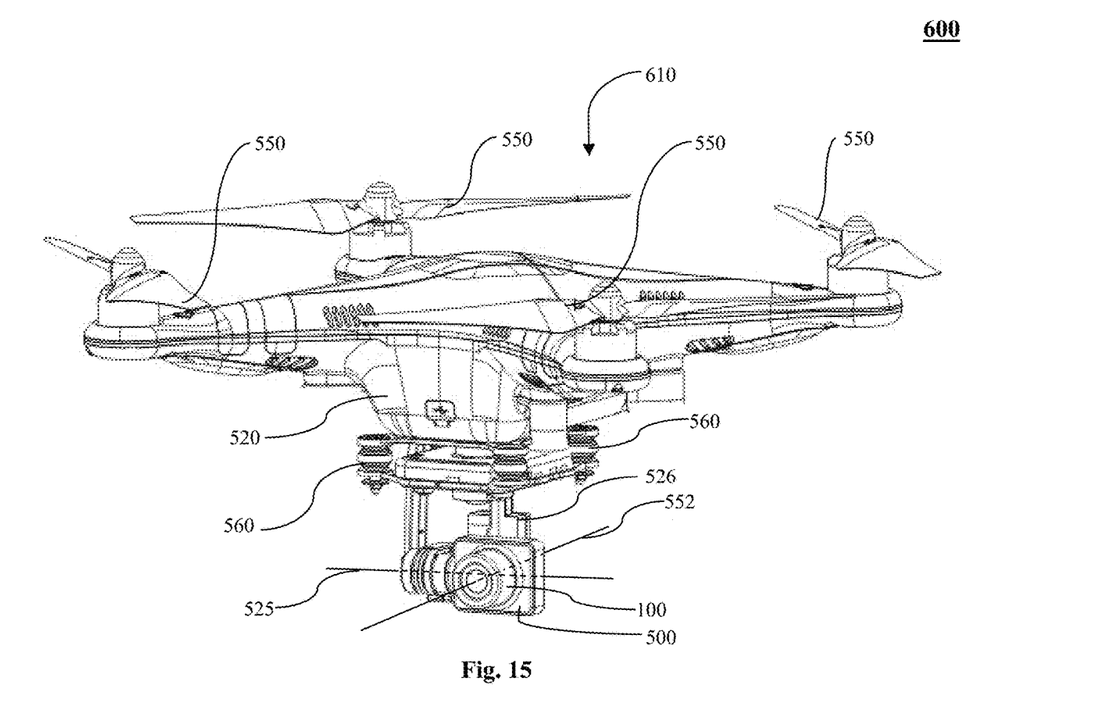
FIG. 15 is an exemplary detail diagram illustrating an exemplary embodiment of an aerial imaging system, wherein the imaging device of FIG. 14 is positioned aboard an Unmanned Aerial Vehicle ("UAV").

FIG. 15 illustrates an embodiment of an exemplary aerial imaging system 600. Turning to FIG. 15, the aerial imaging system 600 includes an aerial vehicle, for example, an Unmanned Aerial Vehicle ("UAV") 610. An imaging device 500 is coupled with a body 520 of the UAV 600. In FIG. 15, the UAV 600 can include a plurality of propellers 550. The imaging device 500 can be coupled to the body 520 of the UAV 600 via a gimbal 526.

The gimbal 526 can be a three-dimensional gimbal that can rotate about three axes, including, but not limited to, a pitch axis 525. The gimbal 526 can be coupled with the body 520 via one or more vibration dampers 560. The imaging device 500 can be coupled with a lens barrel 100 that has zoom capacity for capturing scenes in various distances. The lens barrel 100 can include one or more lens groups 120 and a cam barrel 160 for balancing a center of gravity 128 of the lens groups 120 (collectively shown in FIG. 2). At least one of the one or more lens groups 120 can be movable for providing a zooming operation and/or a focusing operation. The center of gravity 128 of the one or more lens groups 120 can be balanced in accordance with any one of the embodiments described herein.

Because the center of gravity 128 of the one or more lens groups 120 can be balanced when the imaging device 500 zooms in or zooms out, a center of gravity of the lens barrel 100 can be balanced, and thus, a center of gravity of the imaging device 500 can be balanced. Therefore, the lens barrel 100 advantageously can negate an effect of any shift of the center of gravity 128, enabling operations of the gimbal 526 and the imaging device 500 to be stable and reliable.

Figure 16:
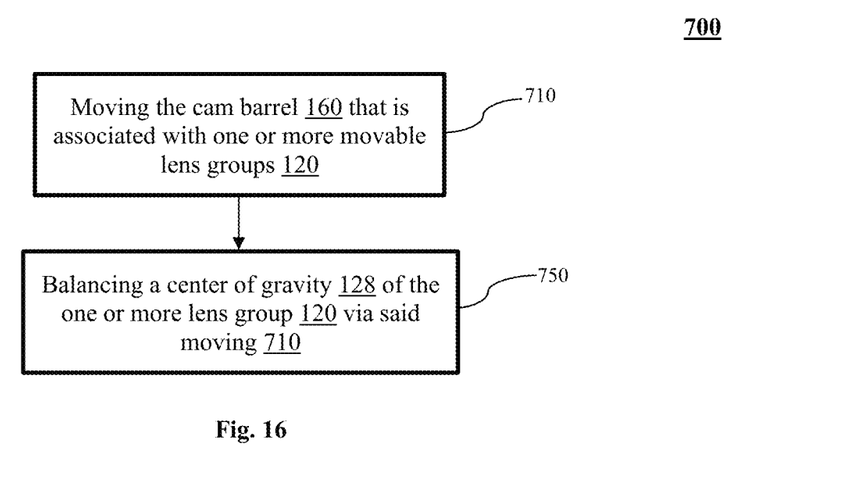
FIG. 16 is a flowchart illustrating an exemplary embodiment of a control method, wherein a cam barrel is moved to balance a center of gravity of one or more lens groups.

FIG. 16 illustrates an embodiment of an exemplary control method 700. Turning to FIG. 16, a cam barrel 160 can be moved, at 710. A center of gravity 128 of one or more movable lens groups 120 thereby can be balanced, at 750.

The cam barrel 160 can be associated with the one or more movable lens groups 120 and can be a component of a lens barrel 100 (shown in FIG. 1). The cam barrel 160 and the one or more lens groups 120 can be provided in the manner as set forth with reference to FIG. 1.

The cam barrel 160 can be moved as the center of gravity 128 of the one or more lens groups 120 is shifted. In some embodiments, the movement of the cam barrel 160 can be controlled via one or more controllers (not shown). The one or more controllers can operate a driving mechanism 165 (shown in FIG. 13) that is associated with the cam barrel 160. The driving mechanism 165 can drive the cam barrel 160 to move in either direction along an optical axis 125. For example, the driving mechanism 165 can drive the cam barrel 160 via a motor 171, a transmission system 172, a driving gear 173 and a driven gear 175 (collectively shown in FIG. 13) in the manner set forth with reference to FIG. 13.

In some embodiments, the one or more lens groups 120 can be moved in a predetermined manner by the cam barrel 160 via certain protruding parts and grooves. The protruding parts and the grooves can be provided, for example, as the protruding parts 352, 353 (collectively shown in FIG. 12) and the grooves 162, 163 (collectively shown in FIG. 13). The movement of the one or more lens groups 120 can be predetermined to change a position of the one or more lens groups 120 in accordance with a zooming requirement of the lens barrel 100.

In some embodiments, the center of gravity 128 of the one or more movable lens groups 120 can be balanced by negating the shift of the center of gravity 128 that is created by the movement of the one or more lens groups 120. The shift of the center of gravity 128 can be negated by offsetting a sum of torque changes of the one or more movable lens groups 120 via the cam barrel 160.

In some embodiments, the cam barrel 160 can move in a first direction along the optical axis 125 that is opposite to a second direction of the shift of the center of gravity 128 of the one or more movable lens groups 120. The movement of the cam barrel 160 can generate a first torque change along the optical axis 125. The first torque change can be used to offset the sum of torque changes of the one or more lens groups 120.

In some embodiments, the center of gravity 128 can be balanced within a range. i.e., the shift of the center of gravity 128 of the one or more lens groups 120 can be maintained within a predetermined range. The predetermined range, for example, can be a range of predetermined percentages of a length of the lens barrel 100. In some embodiments, the predetermined percentages are less than or equal to thirty percent of the length of the lens barrel 100.

The cam barrel 160 can be operated in a mechanical manner and/or an electronic manner. In some embodiments, the cam barrel 160 can be controllably operated via a motor 171 (shown in FIG. 13) that is associated with the cam barrel 160. The cam barrel 160 can be operated in the manner as set forth with reference to FIGS. 12 and 13.

In some alternative embodiments, the lens barrel 100 can be associated with an external weight (not shown) for balancing the center or gravity 128 of the one or more lens groups 120. The cam barrel 160 can cooperate with the external weight to balance the center of gravity 128. In some embodiments, the center of gravity 128 can be balanced at a selected position along the optical axis. The selected position can be continuously distributed along the optical axis 125.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A lens barrel, comprising:
   one or more movable lens groups; and
   a cam barrel associated with the one or more movable lens groups and configured to balance a center of gravity of the one or more movable lens groups by:
      moving to create a first torque change along an optical axis of the lens barrel that negates a second torque change along the optical axis created by a movement of the one or more movable lens groups.

2. The lens barrel of claim 1, wherein the cam barrel is further configured to move in response to the movement of the one or more movable lens groups.

3. The lens barrel of claim 2, wherein the cam barrel is further configured to move to negate a shift of the center of gravity created by the movement of the one or more movable lens groups.

4. The lens barrel of claim 1, wherein the first torque change negates a sum of torque changes of the one or more movable lens groups.

5. The lens barrel of claim 1, wherein the cam barrel is configured to move in a first direction along the optical axis that is opposite to a second direction of a shift of the center of gravity of the one or more movable lens groups.

6. The lens barrel of claim 5, wherein the cam barrel is configured to balance the center of gravity in response to the one or more movable lens groups moving relative to each other.

7. The lens barrel of claim 1, further comprising:
   a stationary barrel associated with an inner surface of the cam barrel.

8. The lens barrel of claim 7, wherein the stationary barrel comprises at least one groove or at least one protruding part to cooperate with the cam barrel.

9. The lens barrel of claim 7, wherein the stationary barrel is configured to cooperate with the cam barrel for guiding the cam barrel to move along the optical axis of the lens barrel.

10. The lens barrel of claim 1, wherein the cam barrel comprises at least one protruding part or at least one groove.

11. The lens barrel of claim 10, further comprising:
   a stationary barrel associated with an inner surface of the cam barrel, the stationary barrel including at least one groove or at least one protruding part;
   wherein the at least one protruding part or the at least one groove of the cam barrel is configured to cooperate with the at least one groove or the least one protruding part of the stationary barrel.

12. The lens barrel of claim 1, wherein the cam barrel is configured to maintain a shift of the center of gravity of the one or more movable lens groups within a predetermined range.

13. The lens barrel of claim 12, wherein the predetermined range is a range of predetermined percentages of a length of the lens barrel.

14. The lens barrel of claim 1, wherein the cam barrel is formed from a plastic material or a metallic material.

15. The lens barrel of claim 1, further comprising:
   an external weight associated with the lens barrel.

16. The lens barrel of claim 15, wherein the external weight is configured cooperate with the cam barrel to balance the center of gravity of the one or more movable lens groups.

17. The lens barrel of claim 16, wherein movements of the one or more movable lens groups are designed for zooming of the lens barrel.

18. The lens barrel of claim 1, wherein the one or more movable lens groups comprise at least one of a first lens group, a second lens group, and a third lens group.

19. The lens barrel of claim 1, wherein a shift of the center of gravity of the one or more lens groups is balanced at selected positions along the optical axis of the lens barrel.

20. A lens barrel, comprising:
one or more movable lens groups;
a cam barrel associated with the one or more movable lens groups and configured to balance a center of gravity of the one or more movable lens groups; and
a stationary barrel associated with an inner surface of the cam barrel and configured to cooperate with the cam barrel for guiding the cam barrel to move along an optical axis of the lens barrel.

\* \* \* \* \*